April 9, 1963 H. F. LIEBRECHT 3,084,981
SELF-LAYING TRACKS
Filed Aug. 18, 1961 3 Sheets-Sheet 1

INVENTOR
HEINRICH FRITZ
LIEBRECHT
By Irwin S. Thompson
ATTY.

April 9, 1963
H. F. LIEBRECHT
3,084,981
SELF-LAYING TRACKS
Filed Aug. 18, 1961
3 Sheets-Sheet 2
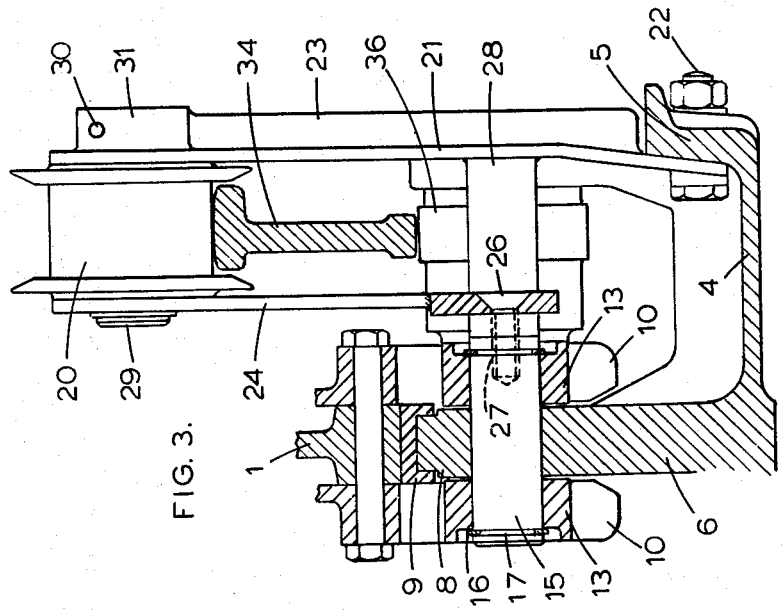
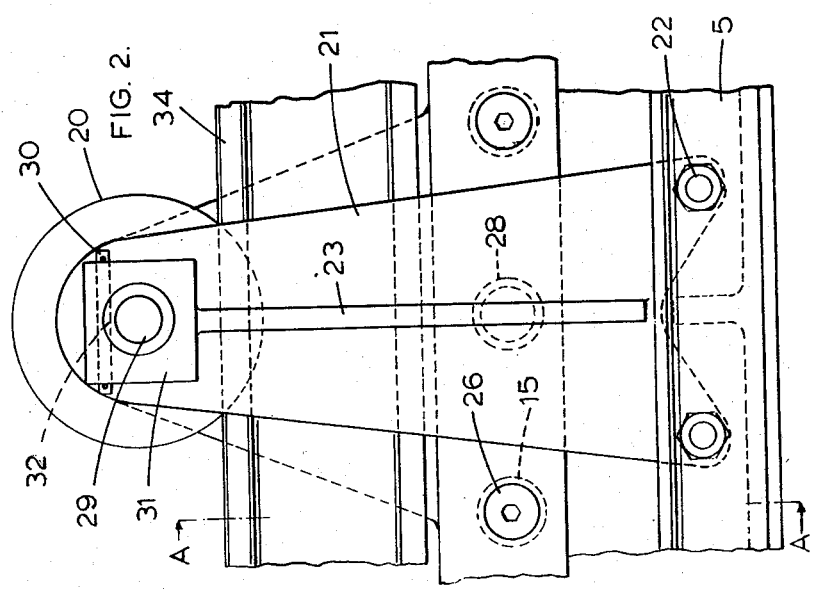
INVENTOR
HEINRICH FRITZ LIEBRECHT
By Irwin S. Thompson
ATTY.

April 9, 1963 H. F. LIEBRECHT 3,084,981
SELF-LAYING TRACKS

Filed Aug. 18, 1961 3 Sheets-Sheet 3

INVENTOR

.HEINRICH FRITZ LIEBRECHT

By Irwin D. Thompson
ATTY.

United States Patent Office 3,084,981
Patented Apr. 9, 1963

3,084,981
SELF-LAYING TRACKS
Heinrich Fritz Liebrecht, London, England, assignor to Leeford (London) Limited, London, England, a British company
Filed Aug. 18, 1961, Ser. No. 132,484
Claims priority, application Great Britain Aug. 23, 1960
7 Claims. (Cl. 305—19)

This invention relates to self-laying tracks and more particularly to self-laying tracks of the kind comprising track sections pivotally connected together in end-to-end relationship, rack means being provided on each track section adapted to co-operate during operation of the track with a toothed wheel within the track so that rotation of the toothed wheel causes the track sections to be laid in succession on the ground and to be raised therefrom in succession.

During operation of such a track, for example when the track is traversing a ditch, it may happen that the track sections immediately below the wheel tend to sag away from the wheel causing a rise of the track sections disposed above the wheel. In this way, therefore, the track may become dislodged from the wheel.

In order to overcome this problem, it has been previously proposed to provide endless flexible members respectively engaged with wheels mounted adjacent the ends of the tracks, there being also provided means intermediate the wheels of each group serving, in predetermined positions of the track, to effect tensioning of the associated flexible member.

The flexible members are liable to be strained and broken especially due to the showering of earth and stones between the flexible members and their wheels.

With a view to meeting this difficulty we have constructed track devices according to the specification of our British Patent No. 856,228 wherein chains are used as the flexible members and their wheels are in the form of sprockets engaged by the chains. This has the effect of ejecting stones and such track devices are satisfactory in use. Nevertheless the construction is somewhat complicated and expensive and chains will in any case eventually become worn and need replacement.

According to the present invention the track guide device comprises a rigid endless rail having upper and lower straight runs and curved ends, said rail being engaged by runners carried by the track sections.

A constructional form of the invention will now be described with reference to the accompanying drawings in which:

FIGURE 2 is a side elevation of one bracket and roller supporting the guide rail, on a larger scale.

FIGURE 3 is a section through one track section taken along the line A—A in FIGURE 2, and FIGURE 4, is a plan view of the bracket and roller shown in FIGURE 2 with the driving wheel omitted.

Figure 1:
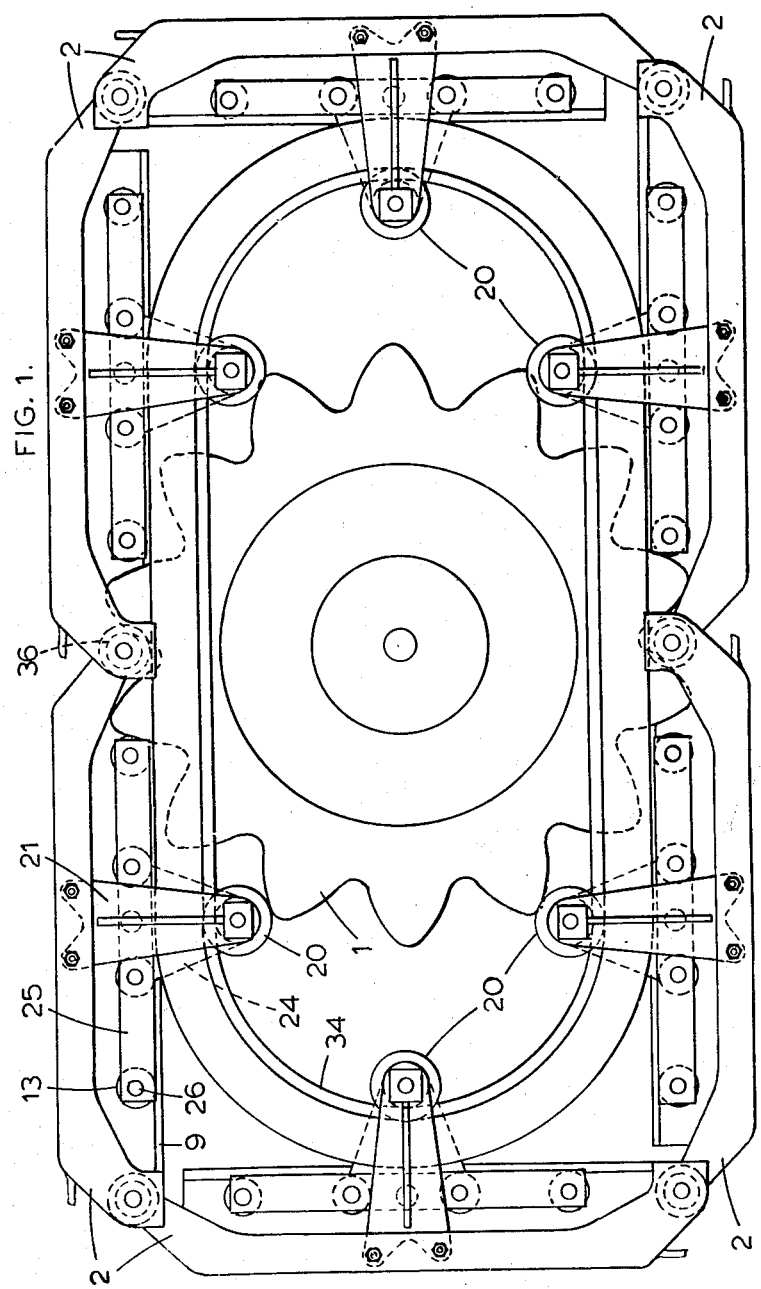
FIGURE 1 is a side elevation of a self-laying track according to the invention.
Figure 4:
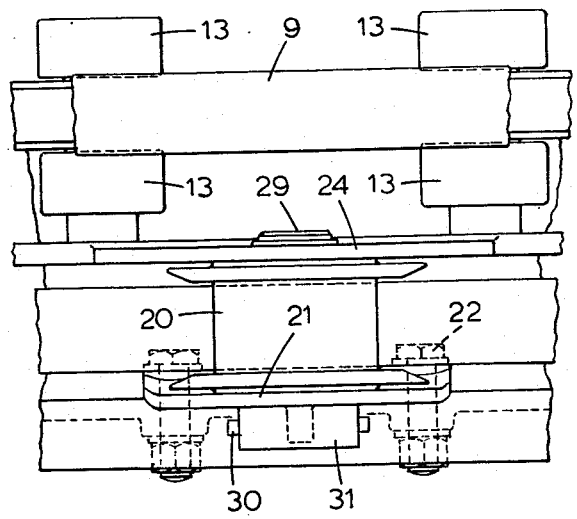

On each end of a back axle of a tractor (not shown) is mounted a driving wheel 1 which is embraced peripherally by six track sections 2 of a self-laying track, the track sections being of equal length and pivotally secured at their ends. As the wheel rotates it lays the sections 2 on the ground and picks the sections up from the ground successively, one position which the track occupies being depicted in FIGURE 1.

Each track section 2 is formed from high duty, light weight alloy and is of channel-shaped cross-section having a flat bottom member 4 which engages the ground during operation of the track and upstanding side members 5. A longitudinally extending, upstanding flange 6 is formed integrally with the section 2 and disposed between the side members 5.

The flange 6 consists of a web formed at its upper end with shoulders 8 upon which is situated a rail 9 of hard wearing metal which is detachably secured to the web as, for example, by countersunk screws (not shown).

On opposite sides of the wheel 1 are provided opposed teeth 10 which together with a rim 11 of the wheel 1 form a peripheral groove round the wheel within which, when the wheel 1 is driven the flange 6 of the track sections move with the rails 9 in contact with the wheel rim 11 which, as with the rails 9 is formed from hard wearing metal.

On opposite sides of each flange 6 are provided rows of rollers 13 in opposed relationship constituting rack means for engagement by the teeth 10 of the wheel. The rollers 13 are mounted on pins 15 which each project on opposite sides of and transversely with respect to the associated flange 6 and are retained thereon by rings 16 which engage in grooves 17 at opposite ends of the pins 15.

Midway between the ends of each track section there are provided two plates forming a bracket which supports a runner in the form of a flanged wheel or roll 20. The outer plate 21 is attached by bolts 22 to the side member 5 and is strengthened by a web 23 welded to it. The inner plate 24 is supported by a longitudinally extending member 25 which is attached to the flange 6 by screws 26 engaging threaded bores 27 in the ends of the pins 15. The two plates 21 and 24 and connected together by a tube 28 welded between them.

The bracket so formed carries a spindle 29 mounted in roller bearing (not shown), which spindle is held axially and prevented from rotation by a pin 30 passing through a block 31 welded to the outer plate 21. The pin 30 engages a groove 32 provided in the pin 30.

The rolls 20 engage the inner periphery of an endless rail 34 having upper and lower straight runs and curved ends. The outer periphery of the rail over part of the straight runs is engaged by rolls 36 which are provided at each pivoted connection between two track sections.

With such a construction the track sections can execute their required movements while the rail moves along in a direction relatively parallel with the ground. The rail does not need to be attached to any part of the track device except that it is mounted in a floating manner upon the rolls, i.e., the rail can float or move up and down and tilt in relation to the wheel. The curved ends will be shaped according to the required motion required for the rolls. The rolls move along the rail as the track device proceeds. The rail may have a plain strip section or may be U-shaped e.g. with the opening of the U directed outwardly of the rail or may be of other convenient shape.

If desired other rolls may be mounted on spindles at or between the ends of the track sections in such a way that they may engage the straight sections of the rail on the side opposite to that on which the midway mounted rolls engage.

The rail of necessity operates offset to the toothed driving wheel within the track and a second rail may be provided on the other side of the central flange if required.

Preferably six tracks sections are provided and these and the driving wheel may be constructed substantially as described in our aforesaid prior specification.

Although the rail is rigid in the sense that it is not flexible like a chain it may nevertheless be capable of slight flexing to accommodate entry of earth between it and the rolls without permanent deformation.

I claim:

1. A self-laying track assembly comprising a toothed wheel, a number of track sections pivotally connected together in end-to-end relationship and surrounding the toothed wheel and carried by this wheel, rack means provided on each track section adapted to co-operate with the toothed wheel during operation of the track so that rotation of the toothed wheel causes the track sections to be laid in succession on the ground and to be raised therefrom in succession, a rigid endless rail encircling the axis of the toothed wheel and extending to about equal extents on opposite sides of said wheel, said rail being freely movable in relation to said wheel, runners carried by the track sections and engaging the rail in the direction to hold the track sections towards the wheel axis.

2. A self-laying track assembly as claimed in claim 1 wherein the rail has upper and lower straight runs and curved ends.

3. A self-laying track assembly comprising a toothed wheel, a number of track sections pivotally connected together in end-to-end relationship and surrounding the toothed wheel and carried by this wheel, rack means provided on each track section adapted to co-operate with the toothed wheel during operation of the track so that rotation of the toothed wheel causes the track sections to be laid in succession on the ground and to be raised therefrom in succession, a rigid endless rail having upper and lower straight runs and curved ends, said rail encircling the axis of the toothed wheel and extending to about equal extents on opposite sides of said wheel, said rail being freely movable in relation to said wheel, brackets carried by and extending inwardly from the track sections, flanged rolls carried respectively by the brackets and engaging the rail in the direction to hold the track sections towards the wheel axis.

4. A self-laying track assembly comprising a toothed wheel, a number of track sections pivotally connected together in end-to-end relationship and surrounding the toothed wheel and carried by this wheel, rack means provided on each track section adapted to co-operate with the toothed wheel during operation of the track so that rotation of the toothed wheel causes the track sections to be laid in succession on the ground and to be raised therefrom in succession, a rigid endless rail having upper and lower straight runs and curved ends, said rail encircling the axis of the toothed wheel and extending to about equal extents on opposite sides of said wheel, said rail being freely movable in relation to said wheel, brackets carried by and extending inwardly from the track sections, flanged rolls carried respectively by the brackets and engaging the rail in the direction to hold the track sections towards the wheel axis, said brackets being each formed by a pair of plates, the outer plate being connected to the side of the track section and the inner plate being connected to a central longitudinal flange formed integrally with the track section along its inner surface.

5. A self-laying track assembly as claimed in claim 4, wherein the rail is positioned between said inner and outer plates of the brackets.

6. A self-laying track assembly as claimed in claim 3, wherein further rolls are provided, one at each pivotal connection between the track sections, said further rolls engaging the outer periphery of the rail.

7. A self-laying track comprising a toothed wheel, a number of track sections pivotally connected together in end-to-end relationship and surrounding the toothed wheel and carried by this wheel, each track section having an integral central longitudinal flange, rack means provided on each track section adapted to co-operate with the toothed wheel during operation of the track so that rotation of the toothed wheel causes the track sections to be laid in succession on the ground and to be raised therefrom in succession, a rigid endless rail having upper and lower straight runs and curved ends, said rail encircling the axis of the toothed wheel and extending to about equal extents on opposite sides of said wheel, said rail being freely movable in relation to said wheel, brackets carried by and extending inwardly from the track sections, said brackets being each formed by a pair of plates, the outer plate being connected to the side of the track section and the inner plate being connected to said central longitudinal flange, flanged rolls carried respectively by the brackets and engaging the rail in the direction to hold the track sections towards the wheel axis, said rack means comprising spindles carried by said longitudinal flanges, and rollers mounted on said spindles, said spindles serving also for mounting said inner plate, screws being provided which pass through said inner plate into threaded bores provided in said spindles.

References Cited in the file of this patent

UNITED STATES PATENTS

| 2,063,238 | Flynn | Dec. 8, 1936 |
| 2,309,603 | Kohn | Jan. 26, 1943 |
| 2,897,014 | Darragh | July 28, 1959 |
| 2,986,429 | Liebrecht | May 30, 1961 |

FOREIGN PATENTS

| 177,866 | Great Britain | Apr. 4, 1922 |
| 583,233 | Germany | Aug. 31, 1933 |